(12) United States Patent
Uchikawa et al.

(10) Patent No.: US 11,356,553 B2
(45) Date of Patent: Jun. 7, 2022

(54) TELEPHONIC TRANSMISSION/RECEPTION CALLING SERVICE METHOD

(71) Applicant: GEEKLINE LLC., Sagamihara (JP)

(72) Inventors: Takuya Uchikawa, Sagamihara (JP); Ten Uchikawa, Sagamihara (JP)

(73) Assignee: GEEKLINE LLC., Sagamihara (JP)

( * ) Notice: Subject to any disclaimer, the term of this patent is extended or adjusted under 35 U.S.C. 154(b) by 0 days.

(21) Appl. No.: 16/693,793

(22) Filed: Nov. 25, 2019

(65) Prior Publication Data

US 2020/0092418 A1 Mar. 19, 2020

Related U.S. Application Data

(60) Division of application No. 16/275,770, filed on Feb. 14, 2019, now Pat. No. 10,506,100, which is a (Continued)

(30) Foreign Application Priority Data

Feb. 3, 2017 (JP) .............................. JP2017-029451

(51) Int. Cl.
*H04M 3/42* (2006.01)
*H04M 19/04* (2006.01)

(52) U.S. Cl.
CPC ... *H04M 3/42374* (2013.01); *H04M 3/42093* (2013.01); *H04M 3/42365* (2013.01); (Continued)

(58) Field of Classification Search
CPC ......... H04M 3/42365; H04M 3/42093; H04M 1/274583; H04M 3/42374; H04M 2203/654; H04M 1/72454; H04W 4/16
See application file for complete search history.

(56) References Cited

U.S. PATENT DOCUMENTS 7,778,399 B2 8/2010 Ambrose
9,060,050 B1 * 6/2015 Chau ..................... H04L 51/043
(Continued)

FOREIGN PATENT DOCUMENTS

JP 2002111788 4/2002
JP 2003174675 6/2003
(Continued)

*Primary Examiner* — Nam T Huynh
(74) *Attorney, Agent, or Firm* — AP Patents; Alexander Pokot

(57) ABSTRACT

An availability-based telephonic transmission/reception calling service method is provided for communicating with a person who has a different lifestyle or who may not be available at a specific call time. When a receiver inputs the receiver's characteristic information and reception/communication availability information into a server, the server acquires and sets the reception/communication availability information. An originator fetches contact information in a memory medium within a device or contact information to be displayed in a separate service on the Internet and selects a receiver. When the contact information of the selected receiver is stored on the server, the server acquires the receiver's reception/communication availability information and displays whether the receiver can receive a call on a screen of an originator's communication device. Thus, the originator can be notified of whether a receiver can receive a call before the originator makes a telephone call via a cellular phone network or the Internet.

19 Claims, 6 Drawing Sheets

Related U.S. Application Data continuation of application No. PCT/JP2018/002603, filed on Jan. 22, 2018.

(52) U.S. Cl.
CPC ...... *H04M 19/04* (2013.01); *H04M 2203/551* (2013.01); *H04M 2203/555* (2013.01); *H04M 2203/558* (2013.01); *H04M 2242/04* (2013.01); *H04M 2242/14* (2013.01); *H04M 2242/16* (2013.01); *H04M 2242/28* (2013.01)

(56) References Cited

U.S. PATENT DOCUMENTS

| | | | |
|---|---|---|---|
| 10,285,019 B2 * | 5/2019 | Kim | H04W 4/029 |
| 2003/0002642 A1 * | 1/2003 | Jorasch | H04M 3/42374 |
| | | | 379/201.01 |
| 2007/0053335 A1 | 3/2007 | Onyon et al. | |
| 2015/0382147 A1 | 12/2015 | Clark et al. | |
| 2016/0301801 A1 * | 10/2016 | Hanya | H04L 67/125 |
| 2017/0034649 A1 | 2/2017 | Dotan-Cohen et al. | |
| 2018/0139587 A1 | 5/2018 | Yang | |
| 2019/0058790 A1 * | 2/2019 | Lawrenson | H04M 3/42365 |

FOREIGN PATENT DOCUMENTS

| | | |
|---|---|---|
| JP | 2004023367 | 1/2004 |
| JP | 2007180907 | 7/2007 |
| JP | 2010028463 | 2/2010 |
| JP | 2014220821 | 11/2014 |
| JP | 2016152496 | 8/2016 |
| JP | 2016157178 | 9/2016 |

* cited by examiner

TELEPHONIC TRANSMISSION/RECEPTION CALLING SERVICE METHOD

CROSS-REFERENCE TO RELATED APPLICATIONS

This present application is Rule 1.53 (b) Divisional Application of a prior U.S. Non-Provisional Ser. No. 16/275,770 filed Feb. 14, 2019 (pending) which is a continuation of a PCT application No. PCT/JP2018/002603 filed on Jan. 22, 2018. This present application claims benefit of and priority from a Japanese Patent Application No. 2017-029451 filed on Feb. 3, 2017. The entire contents of all applications are hereby incorporated by reference thereto.

TECHNICAL FIELD

The present subject matter relates to a telephonic transmission/reception calling service method.

DETAILED DESCRIPTION OF EXEMPLARY EMBODIMENTS

Figure 1:
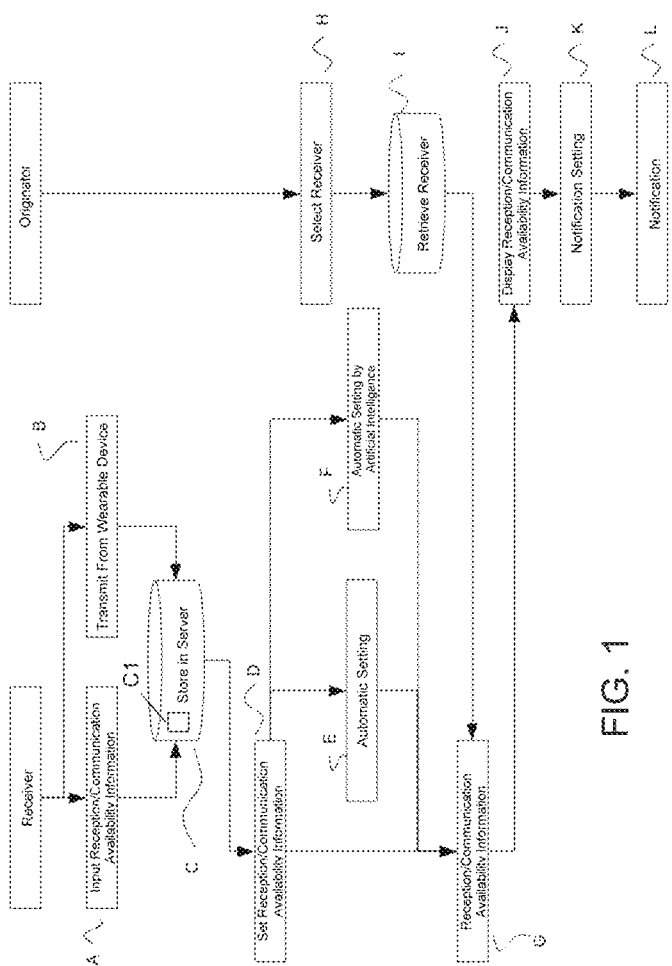
FIG. 1 illustrates an overall flow chart of an exemplary availability-based telephonic transmission/reception calling service method according to an embodiment of the present subject matter.

Exemplary embodiments of the present subject matter will be described with reference to FIGS. 1, 2, 3, 4, 5, and 6.

Prior to proceeding to the more detailed description of the present subject matter, it should be noted that, for the sake of clarity and understanding, identical components which have identical functions have been identified with identical reference numerals throughout the several views illustrated in the drawing figures.

The term "Receiver" when used in this specification and appended claims, refers to a person who is to receive a call or data such as notification(s) or messages with, for example, text, voice, video, image, or vibration, via a network that interconnects electronic devices, for examples such as the Internet or a Bluetooth network.

The term "Originator" when used in this specification and appended claims, refers to a person who is to make a call or transmit data such as notifications or messages with, for example, text, voice, video, image, or vibration, via a network that interconnects electronic devices, for examples such as the Internet or a Bluetooth network.

The term "(Network) Server" when used in this specification and appended claims, refers to a computer or electronic device that provides a service on a network that interconnects electronic devices, for examples such as the Internet or a Bluetooth network. The computer or the electronic device comprises at least a data storage, one or more processors and a non-transitory computer readable medium comprising executable instructions that, when executed by the one or more processors, cause the one or more processors to perform the method steps describe below. The server can also comprise a display. The display can be also referred to in this document as a screen. Server can be also a cloud server. In other words, the data can be stored in a cloud environment.

The term "Artificial Intelligence" when used in this specification and appended claims, refers to a mechanism that artificially achieves human intelligence such as learning, inference, or determination with use of a computer based on human behavior data acquired in past and data acquired from various kinds of information sources. Examples of such information sources can include weather information, traffic congestion information, operation information of public transportation, news, gyro information, GPS information, battery information, and transmission condition information of an electronic device such as a cellular phone, a wearable device, and an on-vehicle electronic device, and calendar information of a user (receiver).

The term "Communication Device" when used in this specification and appended claims, refers to any one of a cellular phone, a smart phone, a wearable device, a tablet, a pad, a computer, and a portable computer. The communication device can include a display. The display can be also referred to in this document as a screen.

The term "Wearable Device" when used in this specification and appended claims, refers to a small electronic device with a communication interface or an electronic device that can be attached to, held to, detached from, applied to, or embedded in a human body. Examples of such wearable devices include, without a limitation, a small cellular phone, a wearable computer, smart glasses, and a smart watch.

The term "Service Website" when used in this specification and appended claims, refers to a website that provides a service relating to the present invention on a network that interconnects electronic devices, for examples such as the Internet or a Bluetooth network.

The term "Internet Service" when used in this specification and appended claims, refers to a service provided on a network that interconnects electronic devices, for examples such as the Internet or a Bluetooth network.

The term "Internet Phone" when used in this specification and appended claims, refers to a communication service including VoIP service, such as Wechat, Line, Messenger, Skype, Snapchat, Viper, WhatsApp and the like.

The term "Cellular Phone Network" when used in this specification and appended claims, refers to a communication network provided by a common carrier to transmit voice or data.

The particular embodiments of the present disclosure generally provide system and methods directed to availability-based telephonic transmission/reception calling service.

In particular embodiments, upon receiving a call, a receiver can notify an originator that "I am currently driving. I cannot answer your call now." when the receiver receives a call, or when a cellular phone network is disconnected, or when a power source is turned off, or when the receiver refuses a call.

In particular embodiments, when an originator makes a call to a receiver's phone for which the receiver has a setting in a busy-state mode, voice such as "I cannot answer your call now. Please redial within 15 seconds in case of emergency" is played. When the originator then redials within 15 seconds, the receiver's phone receives the call in a usual manner.

The other exemplary settings that can be set by the Receiver can include providing any one of the following messages: "I cannot answer your call", "I cannot respond to your message", "I am currently driving", "I am in transit (using public transportation)", "I am sleeping", and "I am in a meeting" (in a case where calendar information inputted into an electronic device is acquired).

In particular embodiments, an availability-based telephonic transmission/reception calling service method or system is provided for communication with a person who has a different lifestyle, with an unfamiliar person, with a sensitive person, or at sensitive time.

Some problems may arise when an originator is to communicate with a person who has a different lifestyle. This situation may arise in communication between a person who works in the daytime and a person who works in the night, in communication with a long-distance driver who has irregular bedtime, or the like.

Furthermore, when a communication device, for example such as a cellular phone is turned off, with only the reception refusal or the busy-state mode, a receiver needs separate means for notifying an originator of available time when the receiver can receive a call. Thus, a receiver may be required to communicate with an originator in advance. Moreover, when a cellular phone is set into a busy-state mode, a problem may arise that an originator who is eager to talk with a receiver cannot talk with the receiver.

With a conventional notification method to an originator, an originator needs to make two telephone calls to a receiver even in case of emergency. Additionally, in case of an earthquake or other disaster where cellular phones are difficult to connect to the cellular phone network, an originator needs to succeed in making two outgoing calls and delivering those two calls within 15 seconds.

Furthermore, a receiver may need to record his/her voice as an audio response message to present available times when the receiver can receive a call, in order to allow any originator to know the receiver's available time. There may also be a problem that such a recoded voice serves as an audio response message for all originators from which the receiver receives a call.

A telephonic transmission/reception calling service method according to an embodiment allows an originator who makes a call via a cellular phone network or the Internet to know whether a receiver can receive a call to talk before the originator makes a call. The receiver can input a period during which the receiver cannot or does not want to receive a call into a server. The server can be a cloud server. The receiver can set a registered voice or a recorded voice. Before the originator makes a call, such receiver's setting for reception/communication availability can be displayed or played to allow the originator to know receiver's reception/communication availability information.

The receiver inputs and sets receiver's characteristic information and reception/communication availability information into the server. The period during which the receiver can receive a call to talk is also defined/set.

The originator can make a call via a cellular phone network or the Internet with use of contact information in an originator's communication device, for example such as a cellular phone, or contact information of an Internet service. The receiver's reception/communication availability information is displayed on an originator's cellular phone immediately before the originator makes a call.

The originator can know the reception/communication availability information of the receiver beforehand by the display on the cellular phone or the voice played from the cellular phone. Therefore, the originator can beforehand determine whether or not to actually make a telephone call. The originator can know when is convenient to the receiver from the reception/communication availability information set in the server by the receiver.

Furthermore, a statement that the receiver can receive a call to talk can be sent from the server to the originator using an email address, short message service, or push notification, after the period set by the receiver. A program is initiated when a notification is received. Setting information on whether to receive a notification is stored in the server.

Furthermore, in an availability-based telephonic transmission/reception calling service method according to an embodiment, the server receives gyro information, GPS information, or health care information transmitted from a cellular phone or a wearable device. The period during which the receiver can receive a call to talk can automatically be set based on the gyro information, the GPS information, or the health care information.

Furthermore, reception/communication availability information of the receiver can be automatically generated by server's high-level automatic setting with artificial intelligence using gyro information, GPS information, or health care information received from a cellular phone or a wearable device, past reception/communication availability information, contact information within cellular phones that either one or both of the receiver and the originator have, and an outgoing/incoming call history for all contact lists of an Internet service.

In an embodiment, it becomes easier to notify the originator of a period during which the receiver can receive a call to talk.

Since the originator can know a period during which the receiver can receive a call to talk in advance, communication is facilitated with a person who has a different lifestyle or an unfamiliar person for business purposes.

FIG. 1 illustrates an embodiment of an availability-based telephonic transmission/reception calling service method that is provided at a service website on the Internet. When a receiver inputs reception/communication availability information (A) or when reception/communication availability information is transmitted from a communication device, for example such as an illustrated wearable device (B), the information is stored in a non-transitory memory or a database C1 device within a server (C). Thus, setting for the reception/communication availability information is conducted (D).

The server (C) used by the receiver can be a different server than the server used by the originator. For example, receiver and originator can use different cellular networks that communicate with each other.

Methods other than using the receiver's input information for setting the reception/communication availability information may selectively be used, which include:

automatic setting (E) employing gyro information, GPS information, or health care information transmitted from the communication device, for example such as a cellular phone or the wearable device (B); and automatic setting using higher-level artificial intelligence (F) with gyro information, GPS information, or health care information transmitted from the cellular phone or the wearable device, past reception/communication availability information, contact information within cellular phones that both of the receiver and the originator have, and an outgoing/incoming call history for all contact lists of Internet services.

The inputted and set information is stored as the receiver's reception/communication availability information (G) in the memory device C1 within the server (C).

In an embodiment, the contact information can be stored within a non-transitory memory medium of the communication device 3 (for example such as the cell phone) owned by the originator or in a remote server. The originator's device fetches contact information in a memory medium within the communication device or contact information to be displayed on the Internet based service and selects a receiver (H). The originator's device retrieves the selected receiver from the memory medium within the server (I). If the retrieved receiver is in the memory medium, the reception/communication availability information of the receiver is obtained (G) and displayed (J) on the originator's communication device.

When the reception/communication availability information displayed on the originator's communication device indicates that the receiver cannot receive a call now, the originator can make a notification setting (K) to send, from the server to the originator, a notification that the receiver can now receive a call to talk, using an email address, short message service, or push notification after the reception/communication unavailability period ends. With the setting to receive the notification, the originator can receive a notification (L) from the server.

In other words, the reception/communication availability information can be acquired and set, by a server, in a response to the receiver inputted characteristic information and stored reception/communication availability information of the receiver. The reception/communication availability information can be then used to display, by the server, on a screen of a communication device of the originator whether the receiver can receive a call to talk. The reception/communication availability information can be automatically set, with the server, using an artificial intelligence with regard to information received from the communication device and a contact information that both of the receiver and the originator have, an outgoing/incoming call history for the contact information of the Internet based service.

Figure 2:
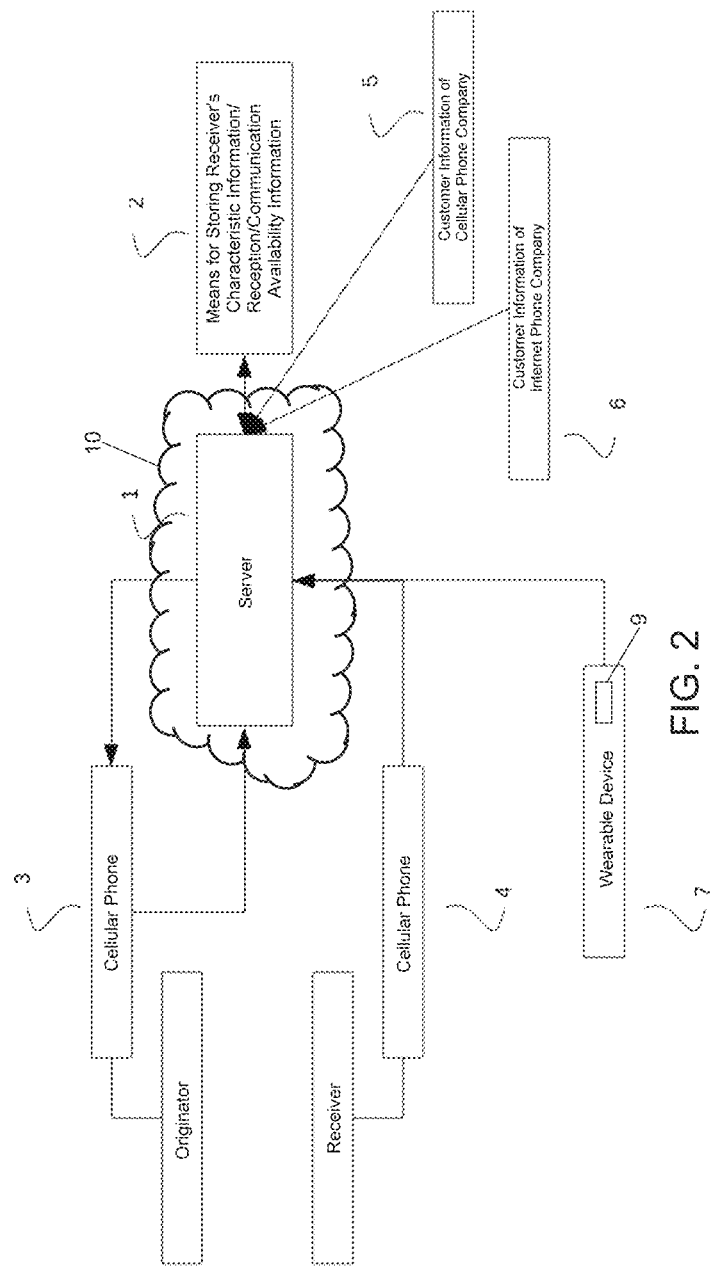
FIG. 2 illustrates an exemplary system configuration diagram for performing a availability-based telephonic transmission/reception calling service method according to an embodiment of the present subject matter.

The availability-based telephonic transmission/reception calling service method according to an embodiment can be provided at a service website on the Internet. As shown in FIG. 2, the availability-based telephonic transmission/reception calling service method can be implemented by means 2 for storing the receiver's characteristic information, the receiver's characteristic information including the reception/communication availability information, and the reception/communication availability information; a server 1 being connected; a communication device, such as an illustrated cellular phone 3 of an originator as a user; a communication device such as an illustrated cellular phone 4 of a receiver; contact information within the cellular phones; customer information 5 of a cellular phone company; contact information 6 of Internet services; and a communication device such as a wearable device 7 of the receiver. The wearable device 7 is illustrated as comprising a display 9. It would be understood that the cellular phone 3 and the cellular phone 4 also comprise displays.

Figure 6:
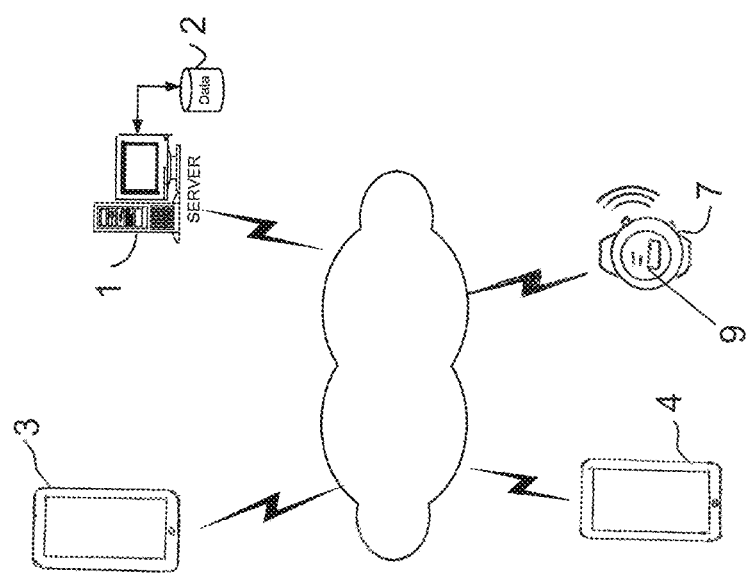
FIG. 6 illustrates an exemplary configuration diagram of a system configured to perform a telephonic transmission/reception calling service method.

FIG. 6 illustrates and exemplary system that can perform the method illustrated in FIG. 2. The server 1 can store in availability information and customer information in the database 2.

An exemplary method in which the receiver inputs reception/communication availability information, stores it into the server, and sets the stored reception/communication availability information will specifically be described below.

Figure 3:
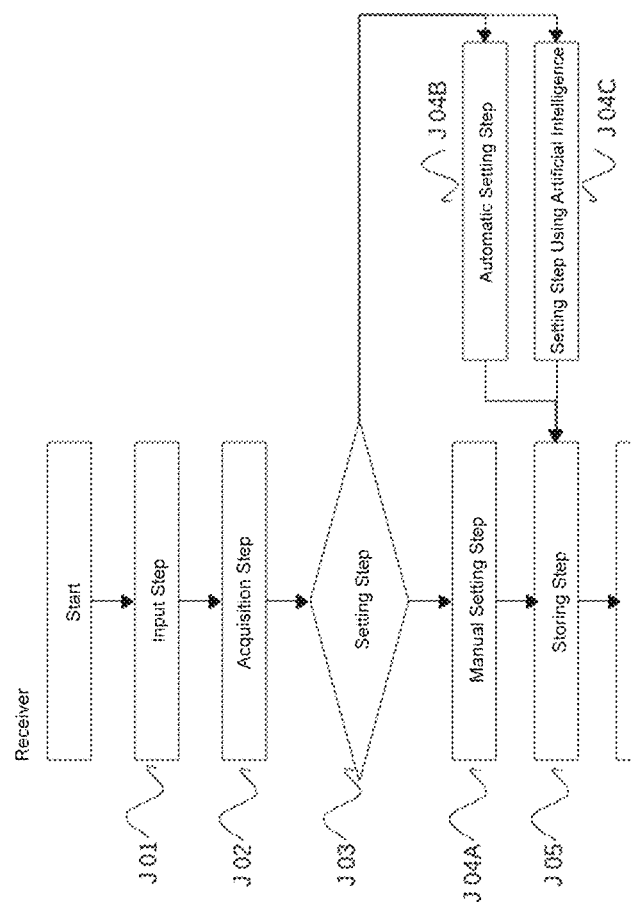
FIG. 3 illustrates an exemplary flow chart showing steps in which a receiver sets reception/communication availability information in a availability-based telephonic transmission/reception calling service method according to an embodiment of the present subject matter.

As shown in FIG. 3, this method includes an input step (J01), an acquisition step (J02), a settings step (J03), a manual settings step (J04A), an automatic settings step (J04B), a settings step using artificial intelligence (J04C), and a storing step (J05).

First, in the input step (J01), the receiver's characteristic information and reception/communication availability information are inputted into the server 1 via the Internet.

Meanwhile, when characteristic information has been inputted in the past or when the customer information 5 of the cellular phone company or the customer information 6 of the Internet telephone company cooperates with the availability-based transmission/reception calling service, the receiver's characteristic information is read from the customer information 5 or the customer information 6 of the external communication device or Internet telephone company. The receiver device inputs the read characteristic information and reception/communication availability information into the server 1 via the Internet, and the server acquires the information (J02).

In the settings step (J03), manual setting of the input reception/communication availability information, automatic setting of the input reception/communication availability information, or higher-level automatic setting using artificial intelligence is selected.

Furthermore, a response message is inputted or selected, or a response voice is recorded or selected. Here, the receiver can input his/her sex, age, and occupation as his/her attribute information, and then notify the server 1 of such information.

Then the receiver device in which the manual settings step (J04A) has been selected sets the reception/communication availability information.

Meanwhile, the automatic settings step (J04B) may be selected to conduct automatic setting with variations of gyro information, GPS information, or health care information transmitted from the communication device, for example such as the cellular phone or the wearable device. Alternatively, the settings step using artificial intelligence (J04C) may be selected to read information that has been set in the past, from the means 2 for storing the receiver's characteristic information and the reception/communication availability information, and to use artificial intelligence instead of the receiver to set the reception/communication availability information based on the read information, the attribute information, gyro information, GPS information, or health care information transmitted from the cellular phone or the wearable device, current weather information and traffic information acquired from the GPS information and/or the gyro information, and outgoing/incoming call histories of both of the receiver device and the originator device.

Thus, in the storing step (J05), the information inputted into the server by the receiver device and the information set by the receiver are recorded and stored in the memory medium within the server 1.

Now a mechanism in which the server receives the gyro information, the GPS information, or the health care information transmitted from the receiver's cellular phone or wearable device such as a smart watch and then automatically sets the reception/communication available time will specifically be described below.

Figure 4:
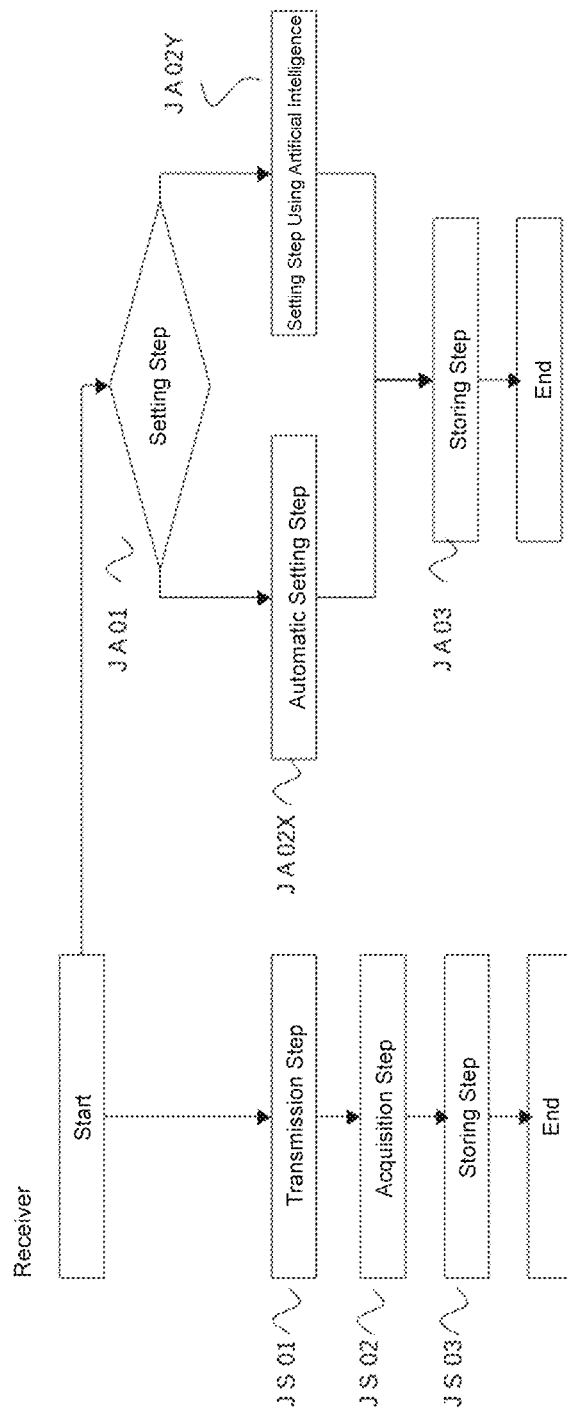
FIG. 4 illustrates an exemplary flow chart showing steps of using receiver's information from a wearable device for setting in a availability-based telephonic transmission/reception calling service method according to an embodiment of the present subject matter.

As shown in FIG. 4, this method includes a transmission step (JS01), an acquisition step (JS02), a storing step (JS03), a settings step (JA01), an automatic settings step (JA02X), a higher-level settings step using artificial intelligence (JA02Y), and a storing step (JA03).

First, in the transmission step (JS01), gyro information, GPS information, or health care information is transmitted from the communication device, for example such as the cellular phone or the wearable device, such as a smart watch, via the Internet (JS01) and acquired by the server 1 (JS02). The acquired gyro information, GPS information, or health care information is stored into the memory medium within the server 1 (JS03).

In the settings step (JA01), an automatic setting method is set.

The automatic settings step (JA02X) may be selected to generate reception/communication availability information from changes in the gyro information, the GPS information, or the health care information based on the transmitted gyro information, the GPS information, or the health care information. Alternatively, the higher-level automatic settings step (JA02Y) may be selected to generate reception/communication availability information with artificial intelligence based on the gyro information, the GPS information, or the health care information, the attribute information, the weather information, the traffic information, the outgoing/incoming call histories of both of the receiver the communication device and the originator communication device.

In the storing step (JA03), the selected and set information is stored into the memory medium within the server 1. The memory medium can be a database or a data storage Next, there will specifically be described a mechanism in which the originator makes a call to the receiver, acquires and displays the reception/communication availability information, then receives a notification when the receiver becomes available to receive a call to talk.

Figure 5:
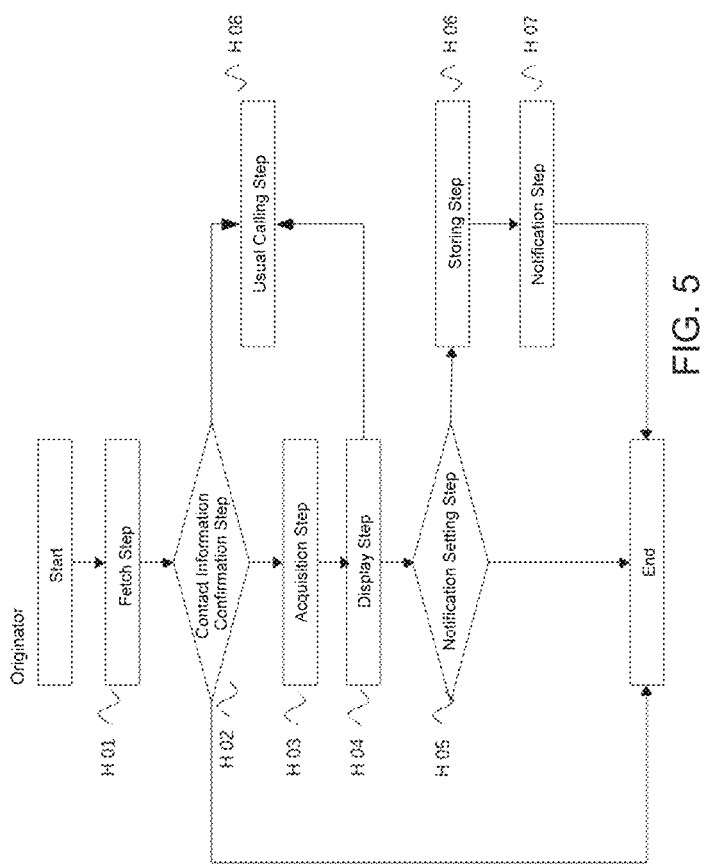
FIG. 5 illustrates an exemplary flow chart showing steps of setting in which an originator fetches a receiver to be called, displays receiver's reception availability information, and sets a notification after the receiver becomes available to receive a call to talk in a availability-based telephonic transmission/reception calling service method according to an embodiment of the present subject matter.

As shown in FIG. 5, this method includes a fetch step (H01) of reading the receiver's telephone number or the receiver's ID of the Internet phone, a contact information confirmation step (H02), an acquisition step (H03), a display step (H04), a notification settings step (H05), a storing step (H06), a notification step (H07), and a usual calling step (H08).

First, the originator device fetches contact information in a memory medium within the cellular phone or contact information to be displayed in a separate service on the Internet (H01) and examines whether the receiver's contact information to be called has been stored in the memory medium within the server 1 (H02).

If the contact information is not present on the memory medium within the server 1, the usual calling step (H08) is selected.

Meanwhile, if the receiver's contact information to be called is stored in the memory medium within the server 1, the receiver's reception/communication availability information is acquired (H03).

If the acquired receiver's reception/communication availability information shows that the receiver can receive a call to talk, the usual calling step (H08) is selected.

Meanwhile, if the receiver cannot receive a call to talk, a message that the receiver cannot receive a call to talk is displayed on the originator's cellular phone (H04).

In the notification settings step (H05), the originator sets whether or not a notification is required after the period during which the receiver cannot receive a call to talk.

The information on the notification setting is stored in the server at the storing step (H06).

If the notification is set to be necessary in the notification settings step, in the notification step (H07), the server 1 notifies the originator that the receiver becomes available to receive a call to talk, using an email address, short message service, or push notification, after a period set by the receiver.

According to the present subject matter, an originator can know whether a receiver can receive a call to talk. Furthermore, the originator can receive a notification from the server 1 that the receiver becomes available to receive a call after a period during which the receiver cannot receive a call to talk. Accordingly, communication can be established with a person who has a different lifestyle or with an unfamiliar person for business purposes, without any stress or with less concern of causing a disruption for the receiver. In other words, the above described subject matter can be directed to a method of establishing a communication between people with different lifestyle(s).

The availability-based system and/or method can be also referred to as a considerate system and/or method in at least that it considers whether the receiver can or cannot accept the call.

In any of the above embodiments, outgoing/incoming call history can comprise outgoing/incoming conversation history. In a non-limiting example, the originator A can selects a receiver B (or C) from the contact list and make a call to that receiver. If the receiver B received calls and made conversations during any time period of a day (24 hours) in the past, the AI notifies the originator A that the receiver B is available to receive a call. If the receiver C received calls and made conversations only between 9:00 and 17:00 in the past, the AI notifies the originator A that the receiver C is unavailable to receive a call when the originator A makes a call to the receiver C outside of this time frame, for example at 18:00.

The technical scope of the present subject matter is not limited to the above embodiments. Various modifications may be made without departing from the spirit of the present subject matter.

Persons of ordinary skill in the art may appreciate that, in combination with the examples described in the embodiments herein, units and algorithm steps can be implemented by electronic hardware, computer software, or a combination thereof. In order to clearly describe the interchangeability between the hardware and the software, compositions and steps of every embodiment have been generally described according to functions in the foregoing description. Whether these functions are performed using hardware or software depends on particular applications and design constraints of the technical solutions. A person skilled in the art may use different methods to implement the described functions for each specific application. However, such implementation should not be considered as beyond the scope of the present invention.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/ simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

Various features may be grouped together in several exemplary embodiments or examples for the purpose of streamlining the disclosure. However, inventive subject matter may lie in less than all features of a single disclosed exemplary embodiment. No feature should be considered "essential" or "necessary" absent express reference to that effect. The present disclosure shall also be construed as implicitly disclosing any embodiment having any suitable combination of disclosed features or examples (i.e., combinations of features or examples that are not incompatible or mutually exclusive) that appear in the present disclosure, including those combinations of features or examples that may not be explicitly disclosed herein in a stated combination.

If the provisions of 35 USC. ctn. 112 6 are desired to be invoked in any apparatus claim associated herewith, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC. sctn. 112 6 are not intended to be invoked for that claim.

Anywhere the term "comprising" is used, embodiments and components "consisting essentially of" and "consisting of" are expressly disclosed and described herein."

Furthermore, the Abstract is not intended to be limiting as to the scope of the claimed subject matter and is for the purpose of quickly determining the nature of the claimed subject matter.

INDUSTRIAL APPLICABILITY

The convenience can be increased in communication using cellular phones or wearable cellular communication devices.

DESCRIPTION OF REFERENCE NUMERALS AND SIGNS

A: Step of inputting receiver's reception/communication availability information
B: Step of transmission from wearable device of receiver
C: Step of storing reception/communication availability information inputted by a receiver, transmitted gyro information, GPS information, or health care information in a server
C1: Data storage or data base
D: Step of setting receiver's reception/communication availability information
E: Step of automatically setting receiver's reception/ communication availability information from gyro information, GPS information, or health care information F: Step of automatically setting receiver's reception/communication availability information with higher-level artificial intelligence from gyro information, GPS information, or health care information, contact information within cellular phones that both of the receiver and the originator have, and an outgoing/incoming call history for all contact lists of Internet services
G: Reception/communication availability information set by a receiver
H: Step of originator's selecting a receiver
I: Step of originator's retrieving a receiver from a memory medium within a server
J: Step of displaying receiver's reception/communication availability information on an originator's communication device illustrated as a cellular phone
K: Notification settings step of setting whether to send notification to an originator from a server in a case of a period during which receiver's reception/communication availability information indicates unavailability
L: Step of sending a notification to an originator from a server in a case of a period during which receiver's reception/communication availability information indicates unavailability
1: Server, can be also a cloud based server.
2: Means for storing receiver's characteristic information and reception/communication availability information. Such means can be a data storage, a database or a non-transitory computer readable medium
3: Originator's communication device illustrated as a cellular phone
4: Receiver's communication device illustrated as a cellular phone
5: Customer information of a cellular phone company
6: Customer information of Internet telephone company
7: Communication device illustrated as a Wearable device
9: Display or screen of the Communication Device
10. Cloud environment
J01: Receiver's input step
J02: Step of server's acquiring receiver's information
J03: Settings step of selecting one of receiver's manual setting, automatic setting, and automatic setting with higher-level artificial intelligence
J04A: Receiver's manual settings step
J04B: Receiver's automatic setting
J04C: Receiver's settings step using artificial intelligence
J05: Step of storing receiver's setting in a memory medium of a server
JS01: Transmission step of transmitting information from a receiver's wearable device to a server
JS02: Acquisition step of server's acquiring information transmitted from a receiver's wearable device
JS03: Step of storing information transmitted from a receiver's wearable device in a memory medium of a server
JA01: Settings step of selecting one of automatic setting with information transmitted from a receiver's wearable device and higher-level automatic setting with artificial intelligence
JA02X: Automatic settings step of automatic setting with information transmitted from a receiver's wearable device
JA02Y: Settings step of higher-level automatic setting with artificial intelligence using information transmitted from a receiver's wearable device
JA03: Step of storing information on selection of automatic setting with information transmitted from a receiver's wearable device and automatic setting with artificial intelligence, and information on the setting in a memory media of a server
H01: Fetch step of originator's fetching a receiver to be called
H02: Contact information confirmation step of confirming a receiver read by an originator
H03: Acquisition step of acquiring receiver's reception availability information read by an originator
H04: Display step of displaying receiver's reception availability information read by an originator
H05: Notification settings step of originator's determining and setting whether a server sends a notification to the originator after a receiver becomes available to receive a call to talk.
H06: Step of storing originator's notification setting in a memory medium of a server
H07: Notification step of server's sending a notification to an originator

What is claimed is:

1. A computer-implemented availability-based telephonic transmission/reception calling service method, the method comprising:
   inputting, by a receiver, a characteristic information of the receiver into a server;
   automatically setting, with the server in a response to characteristic information and using data that has been set in past and learned with artificial intelligence based on information received from a communication device, a contact information within cellular phones that both of the receiver and an originator have, and an outgoing/incoming call history for contact information of an Internet based service, the reception/communication availability information of the receiver,
   wherein the reception/communication availability setting made with the artificial intelligence is changeable by the receiver; and
   notifying, with the server, a communication device of an originator whether the receiver can receive the call before the originator makes a call via a cellular phone network or an Internet based service.

2. The availability-based telephonic transmission/reception calling service method as recited in claim 1, wherein notifying comprises sending, with the server, a notification to the originator via any one of an email, a push notification, and a short message service after a period during which the receiver cannot receive the call to talk.

3. The availability-based telephonic transmission/reception calling service method as recited in claim 1, further comprising:
   determining, with the server, whether the characteristic information and the reception/communication availability information of the receiver have been stored in a memory medium of the server; and
   storing, in the memory medium of the server, the characteristic information of the receiver when the characteristic information and the reception/communication availability information of the receiver have not been stored in a memory medium of the server.

4. The availability-based telephonic transmission/reception calling service method as recited in claim 1, further comprising reading, by the originator, a contact information in a memory medium of the communication device of the originator or a contact information to be displayed on the Internet based service, and notifying, with the server, the originator of whether the receiver can receive the call to talk before the originator makes the call.

5. The availability-based telephonic transmission/reception calling service method as recited in claim 1, further comprising reading, by the originator, a contact information in a memory medium of the communication device of the originator or a contact information to be displayed on the Internet based service, and displaying, with the server, the reception/communication availability information of the receiver for a specific originator on a screen of the communication device of the specific originator.

6. The availability-based telephonic transmission/reception calling service method as recited in claim 1, further comprising an automatic setting step of transmitting, to the server, reluctance to receive the call via the cellular phone network or the Internet based on one of a health care information from the communication device, a gyro information, and a GPS information of a cellular phone or a wearable device.

7. The availability-based telephonic transmission/reception calling service method as recited in claim 1, wherein an ID of an Internet phone is used instead of a telephone number when the originator and the receiver use the Internet phone.

8. The availability-based telephonic transmission/reception calling service method as recited in claim 1, wherein notifying comprises displaying information on a screen of the communication device.

9. A computer-implemented availability-based telephonic transmission/reception calling service method of notifying an originator of whether a receiver, who is to receive a call, can receive the call before the originator makes the call via a cellular phone network or an Internet based service, the method comprising:
    automatically setting, with a server in a response to inputted characteristic information by the receiver and using data that has been set in past and learned with artificial intelligence based on information received from a communication device, a contact information within cellular phones that both of the receiver and the originator have, and an outgoing/incoming call history for contact information of an Internet based service, a reception availability information of the receiver; and
    notifying, with the server, a communication device of the originator, of the reception availability information comprising one of a reception availability of the receiver to receive the call and a reception unavailability of the receiver to receive the call.

10. The availability-based telephonic transmission/reception calling service method as recited in claim 9, further comprising changing by the receiver, the reception/communication availability setting made with the artificial intelligence.

11. The availability-based telephonic transmission/reception calling service method as recited in claim 9, further comprising inputting, by the receiver, a characteristic information and a reception/communication availability information of the receiver into the server via the Internet based service.

12. The availability-based telephonic transmission/reception calling service method as recited in claim 9, further comprising transmitting, from a wearable device, a characteristic information and a reception/communication availability information of the receiver into the server.

13. The availability-based telephonic transmission/reception calling service method as recited in claim 12, wherein said characteristic information comprises a period during which the receiver cannot or does not want to receive the call.

14. The availability-based telephonic transmission/reception calling service method as recited in claim 9, further comprising retrieving, by the originator, a stored contact information of the receiver.

15. The availability-based telephonic transmission/reception calling service method as recited in claim 9, further comprising transmitting, by the server in a response to a notification setting from the originator, a notification that the receiver can receive the call after a period of previously displayed reception/communication unavailability of the receiver ends.

16. The availability-based telephonic transmission/reception calling service method as recited in claim 15, wherein transmitting the notification comprises transmitting said notification using one of an email address, a short message service, and a push notification.

17. The availability-based telephonic transmission/reception calling service method as recited in claim 9, wherein the communication device comprises any one of a cellular phone, a smart phone, a wearable device, a tablet, a pad, a computer, and a portable computer.

18. The availability-based telephonic transmission/reception calling service method as recited in claim 9, wherein setting the reception/communication availability information further comprises reading stored receiver's characteristic information.

19. A tangible computer system programmed to implement a method of notifying an originator of whether a receiver, who is to receive a call, can receive the call before the originator makes the call via a cellular phone network or an Internet based service, the method comprising:
    automatically setting, with a server, a reception availability information of the receiver using artificial intelligence with regard to inputted characteristic information by the receiver and using data that has been set in past and learned with artificial intelligence based on information received from a communication device, a contact information within cellular phones that both of the receiver and the originator have, and an outgoing/incoming call history for contact information of an Internet based service; and
    notifying, with the server, a communication device of the originator whether the receiver can or cannot receive the call.

* * * * *